(No Model.)  2 Sheets—Sheet 1.
C. F. WINKLER.
RAILWAY ELECTRIC MOTOR.

No. 466,914. Patented Jan. 12, 1892.

WITNESSES:
Frank S. Ober
Edward A. Wagner

INVENTOR:
Charles F. Winkler.
BY
W. B. Johnston
ATTORNEY.

(No Model.)  2 Sheets—Sheet 2.
C. F. WINKLER.
RAILWAY ELECTRIC MOTOR.
No. 466,914. Patented Jan. 12, 1892.
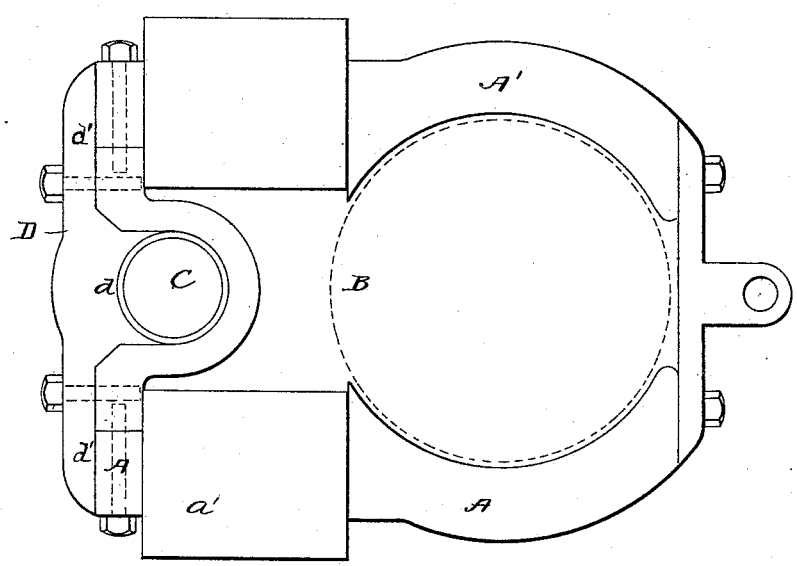
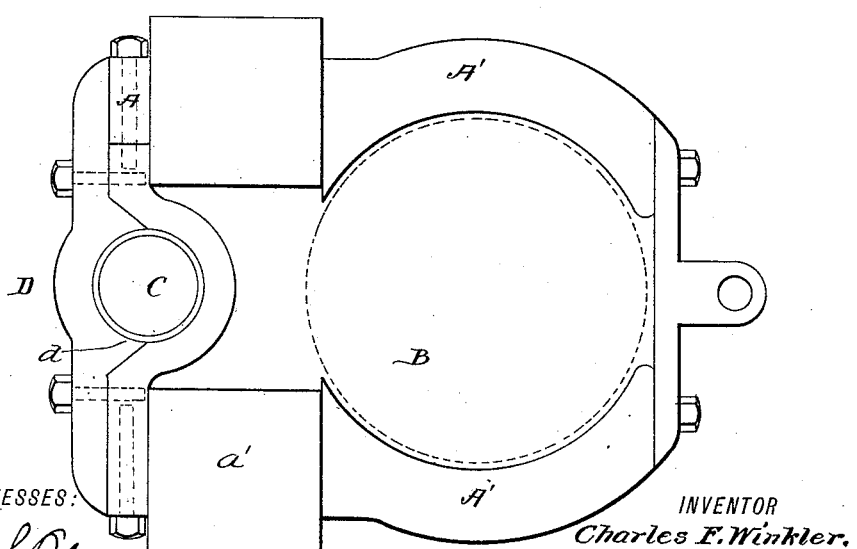
WITNESSES:
Frank S. Ober
Edward A. Wagner
INVENTOR
Charles F. Winkler.
BY
W. J. Johnston
ATTORNEY.

UNITED STATES PATENT OFFICE.

CHARLES F. WINKLER, OF TROY, NEW YORK.

RAILWAY ELECTRIC MOTOR.

SPECIFICATION forming part of Letters Patent No. 466,914, dated January 12, 1892.

Application filed March 26, 1891. Serial No. 386,508. (No model.)

*To all whom it may concern:*

Be it known that I, CHARLES F. WINKLER, a citizen of the United States, residing in Troy, in the county of Rensselaer and State of New York, have invented certain new and useful Improvements in Railway Electric Motors, of which the following is a specification.

This invention has reference to electric motors specially adapted for street-car work.

The object of the invention is to provide a motor which shall be adapted for direct gearing to an axle and in which the size of the machine may be large in proportion to the size of the gear-wheel on the axle with which its armature-shaft engages.

To this end my invention consists of the construction and combination of parts hereinafter described and claimed.

Figure 1:
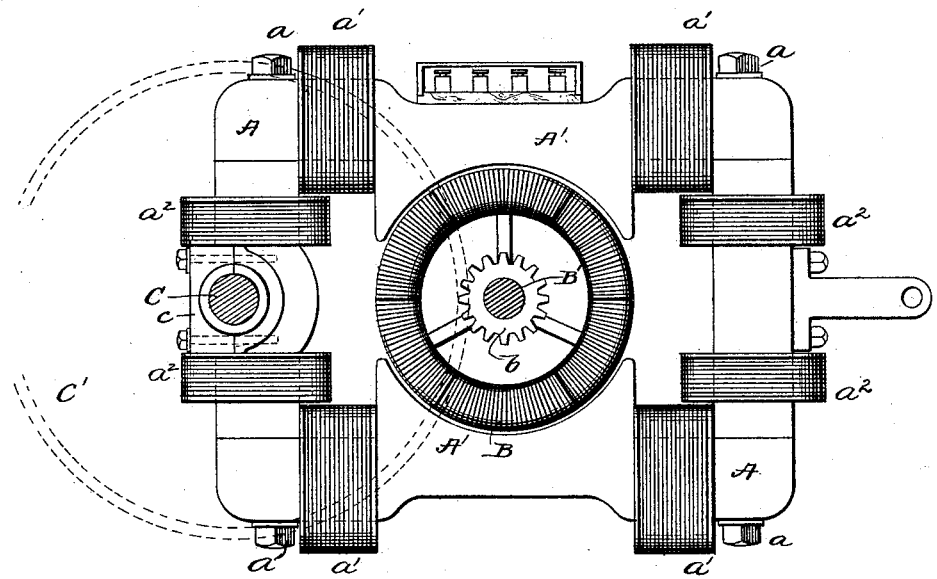
Figure 2:
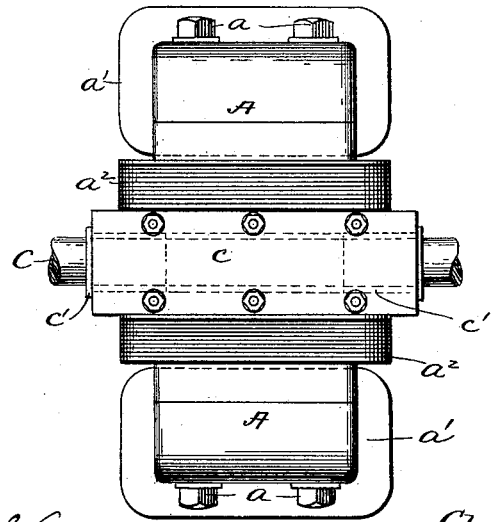

In the accompanying drawings, Figure 1 represents a side elevation of the motor. Fig. 2 represents an elevation thereof, and Figs. 3 and 4 represent modifications of my invention.

A represents the iron cores of the field-magnets, and A' the pole-pieces connected therewith. This structure may be made in either two or four parts bolted together at the corners by means of the bolts $a$.

B represents the armature, and B' the armature-shaft carrying the pinion $b$.

C represents one of the axles of a vehicle which the motor is intended to drive, and the dotted line C' represents the pitch-line of a spur-gear on the axle meshing with the pinion $b$. Now, in order to have properly-proportioned gear-wheels for a given speed and power, and at the same time use a consequent pole-motor of the proper size, I have found that it is necessary to devise a new construction of field-magnet which will permit me to bring the armature-shaft and axle nearer together without making the machine smaller. The change which I have made consists, first, in forming one-half of the axle-boxes in the core of the field-magnet, and, second, in dividing the coils of the field-magnet and locating them in a special manner upon the core. These two features enable me to bring these two shafts closely together, thereby making the entire machine more compact. The axle C has its bearing in a long box extending across the end of the core. This box is formed one half in the field-magnet core and the other half in a cap $c$, bolted thereto. The box extends beyond each side of the field-magnet core, so that oil from the bearings will not drip upon the field-magnet coils. The bearing-surface of the axle is only at the ends of the box in two metal bushings $c'$, as shown in Fig. 2.

Each half of the field-magnet coils is divided into two parts $a'$ and $a^2$. These parts are wound upon separate spools, and one of them is placed on the horizontal part of the core close to the pole-pieces, and the other half is placed at right angles thereto on the vertical portion of the core. The first one $a'$ occupies all the space between the pole-piece and the vertical portion of the core, so that the second one $a^2$ overlaps the first one and does not interfere with it. By dividing the coils in this way instead of winding them upon one short core I get a large number of turns with a small amount of wire, and by overlapping the spools I bring the yokes or outer extremities of the field-magnet structure as near to the armature as possible, and thus produce a very compact machine.

In order to prevent an increase of the resistance of the magnetic circuit by reason of a smaller cross-section of iron at the point where the axle-box is formed, I build the machine with the same size of cross-section at this point, but deflect the core inward, as shown. This, however, slightly unbalances the field-circuit by making one side a little longer than the other, and this defect I overcome by winding a few more turns upon the coils on the opposite side of the same.

In Figs. 3 and 4 I show modifications of machines which accomplish the same object for a motor having a U-shaped field-magnet as are accomplished in the consequent polar type hereinbefore described. In these forms the coils are not divided, but are finished out their full length, and the relative distance between the axle and armature-shaft is maintained by extending the curvature of the back yoke inward. Thus in Fig. 3 the back yoke is shown extended or curved inward to such an extent that the axle is brought directly between the two field-coils. In Fig. 4 the inward extension is not quite so great for the reason that the coils are not so long. In these cases the cap or outer half of the journal-box follows the axle inward and is formed with a kind of plug $d$, having one-half of the bearing formed in its face. The cap has lateral projections $d'$ $d'$, which extend the full length of the back yoke and across the joints between the back yoke and field-magnet cores. The abutting surfaces at all points make a close fit, so that the magnetic resistances due to the joints between the back yoke and the magnet-cores will be balanced by the conducting cap-piece D.

Having thus described my invention, I claim—

1. The combination, with a car-axle, of an electric motor geared directly thereto, said motor having field-magnet coils divided into sections placed approximately at right angles to and overlapping each other, for the purpose described.

2. In an electric motor, a back yoke extending inward toward the armature and between the field-coils, in combination with a shaft-bearing located in said extension, substantially as described.

3. In a dynamo-electric machine or motor, the combination, with a back yoke and field-core bolted together, of a plate of magnetic material overlapping the joint between them, for the purpose set forth.

In witness whereof I have hereunto signed my name in the presence of two subscribing witnesses.

CHARLES F. WINKLER.

Witnesses:
WM. A. ROSENBAUM,
FRANK S. OBER.